(12) United States Patent  
Akira

(10) Patent No.: US 6,628,868 B2
(45) Date of Patent: Sep. 30, 2003

(54) IMAGE FORMING APPARATUS HAVING COOLING MONITORING CIRCUIT

(75) Inventor: Toshiro Akira, Wakayama (JP)

(73) Assignee: Noritsu Koki Co., Ltd., Wakayama-Ken (JP)

(*) Notice: Subject to any disclaimer, the term of this patent is extended or adjusted under 35 U.S.C. 154(b) by 145 days.

(21) Appl. No.: 09/802,463

(22) Filed: Mar. 9, 2001

(65) Prior Publication Data

US 2001/0021297 A1 Sep. 13, 2001

(30) Foreign Application Priority Data

Mar. 10, 2000 (JP) ........................................ 2000-066005

(51) Int. Cl.[7] ................................................ G02B 6/06
(52) U.S. Cl. .................... 385/116; 385/134; 385/147; 385/901; 355/30; 362/554
(58) Field of Search ................................ 385/115, 116, 385/120, 901, 134, 147; 362/554; 355/30; 174/16.1

(56) References Cited

U.S. PATENT DOCUMENTS

| | | | | |
|---|---|---|---|---|
| 4,704,660 A | * | 11/1987 | Robbins | 362/293 |
| 4,918,536 A | * | 4/1990 | Sakakibara et al. | 347/230 |
| 5,099,399 A | * | 3/1992 | Miller et al. | 362/580 |
| 5,150,154 A | * | 9/1992 | Kuwabara | 315/117 |
| 5,187,765 A | * | 2/1993 | Muehlemann et al. | 385/115 |
| 5,430,523 A | * | 7/1995 | Tanibata | 355/27 |
| 5,528,344 A | * | 6/1996 | Yamaguchi et al. | 399/110 |
| 5,706,061 A | * | 1/1998 | Marshall et al. | 348/742 |
| 5,966,238 A | * | 10/1999 | Copenhaver et al. | 359/350 |
| 6,000,464 A | * | 12/1999 | Scafidi et al. | 165/104.33 |
| 6,382,824 B1 | * | 5/2002 | Prasad et al. | 362/551 |

* cited by examiner

Primary Examiner—Robert H. Kim
Assistant Examiner—Michael H Caley
(74) Attorney, Agent, or Firm—Fulbright & Jaworski L.L.P.

(57) ABSTRACT

An image forming apparatus includes a number of light emitting elements capable of emitting light beam onto a photosensitive material based on given image information, a number of optical fibers extending between a light source and the light emitting elements for guiding light irradiated from the light source to the light emitting elements, each of the optical fibers having a light receiving end for receiving the irradiated light, and a cooling blower device for cooling the receiving ends of the optical fibers with gas stream. The apparatus further includes a controller operable to execute a pre-blowing/cooling step of operating the cooling blower device for a predetermined period before the light source is turned ON in response to an ON instruction.

6 Claims, 6 Drawing Sheets

IMAGE FORMING APPARATUS HAVING COOLING MONITORING CIRCUIT

BACKGROUND OF THE INVENTION

1. Field of the Invention

The present invention relates to an image forming apparatus comprising a number of light emitting elements capable of emitting light beam onto a photosensitive material based on given image information, a number of optical fibers extending between a light source and the light emitting elements for guiding light irradiated from the light source to the light emitting elements, each of the optical fibers having a light receiving end for receiving the irradiated light, and a cooling device for cooling the receiving ends of the optical fibers with gas stream.

2. Background of the Related Art

With the image forming apparatus of the above-noted type, a number of optical fibers of a small diameter are bundled together to be used as a kind of flexible light guiding means. And, the irradiated light from the light source is intensified by means of a converging means such as a convex lens and then this intensified light is caused to enter a small flat terminal face of the bundled optical fibers, i.e. the light receiving ends of the fibers.

Therefore, the bundled optical fibers, in particular, their light receiving ends, tend to be overheated in the course of transmission of the light through the optical fibers. And, especially when the optical fibers are made of resin (e.g. a typical commercially available optical fiber made of resin has a manufacturer's guaranteed heat resistant value of 70° C. or slightly higher as its maximum allowable temperature), the light receiving end of the fiber may be deformed by the heat, thus impaired in its flatness, leading to abnormal reduction in the light incident efficiency.

Then, as means for protecting the optical fiber per se against the heat, it has been proposed to provide cooling means for cooling the light receiving end of the optical fiber with gas stream such as air stream. As this cooling means, there is used a blower fan which is rotatably driven by means of an electric motor. This blower fan is operated while the light source is ON and is stopped simultaneously with turning OFF of the light source. In this manner, the convention has adopted a simple operational scheme synchronizing the activation/deactivation of the fan with ON/OFF of the light source.

Aside from the above, with the conventional image forming apparatus described above, there often occurs another phenomenon of dust (e.g. fibrous dust) being accumulated on the light receiving end of the optical fibers. In such case, even when the apparatus includes a cooling device such as above, as soon as the light source is switched ON, some of the accumulated dust may be carbonized quickly by the heat and stuck on the light receiving end of the optical fiber before it can be effectively blown away by the air stream from the cooling fan. Then, there occurs local reduction in the transmittivity of the optical fibers, again resulting in deterioration in the quality of image to be formed by the image forming apparatus. Moreover, if the optical fiber is made of resin, the reduction in transmittivity due to the carbonized dust described above will render the light receiving end of the optical fiber even more vulnerable to the heat of the irradiated light from the light source, so that the local melting deformation thereof will more likely occur. Then, in the worst case, replacement of the entire image forming apparatus (e.g. the entire digital exposing head thereof) may become necessary.

One conceivable cause of the above-described problem is as follows. The amount of light irradiated from the light source rises quickly upon turning ON of the light source. On the other hand, the rotational speed of the electric motor constituting the cooling device does not rise so quickly. Hence, there is a certain amount of time lag before the cooling effect of the cooling device asserts itself on the light receiving end of the optical fiber. During this short time lag, the overheating and subsequent carbonization of accumulated dust by the irradiated light occurs on the light receiving end of the optical fiber. Once the accumulation and subsequent carbonization of the dust on the terminal face of the optical fiber has developed to a certain degree, even if the cooling device is beginning to provide its full cooling effect after lapse of the time lag, this may be too late, so that there will be no recovery in the reduced light transmittivity at the light receiving end of the optical fiber.

The present invention attends to the above-described state of the art. The primary object of the invention is to provide an image forming apparatus which can avoid the above-described problem of reduction in the light transmittivity of the optical fibers by preventing dust, when accumulated on the light receiving end of the optical fiber, from becoming carbonized by the heat of the irradiated light from the light source.

SUMMARY OF THE INVENTION

For accomplishing the above-noted object, an image forming apparatus according to the present invention comprises:

- a number of light emitting elements capable of emitting light beam onto a photosensitive material based on given image information;
- a number of optical fibers extending between a light source and the light emitting elements for guiding light irradiated from the light source to the light emitting elements, each of the optical fibers having a light receiving end for receiving the irradiated light;
- a cooling blower device for cooling the receiving ends of the optical fibers with gas stream; and
- a controller operable to execute a pre-blowing/cooling step of operating the cooling blower device for a predetermined period before the light source is turned ON in response to an ON instruction.

With the above-described feature, according to the image forming apparatus of the invention, the light source is not immediately turned ON in response to an ON instruction. Instead, the illumination of the light source is allowed only when the required condition of execution of the pre-blowing/cooling step has been met, that is, only after the cooling blower device has been operated for a predetermined time period. That is, for the predetermined time period between input of the ON instruction to the light source and the actual illumination of the light source, the preliminary operation of the cooling blower device is effected. And, during this preliminary operation, dust accumulated on the light receiving end of the optical fibers will be blown away by the cooling gas current fed from the cooling blower device to the light receiving end of the optical fibers, so that the blown dust will be moved to a surface or into tissue of a dust collecting filter which is disposed within a ventilation hole formed between a housing of the image forming apparatus and the outside. Accordingly, it is possible to prevent the dust from being carbonized by the heat of the irradiated light and permanently stuck on the light receiving ends of the optical fibers.

Consequently, it becomes possible to avoid deterioration in the light transmittivity of the optical fibers and corresponding deterioration in the quality of image to be formed by the image forming apparatus and to avoid also fusing deformation of the light receiving ends of the optical fibers and the resultant replacement of the entire digital exposure head of the apparatus can be avoided also.

According to a further characterizing feature of the present invention, the apparatus further comprises:

light modulating means for modulating wavelength of the irradiated light, the light modulating means being a rotary filter unit interposed between the light source and the optical fibers, the rotary filter unit including a plurality of color filters arranged side by side along a peripheral direction of the filter unit and having cut wavelength ranges different from each other; and rotation detecting means for determining whether a rotational speed of the rotary filter unit is within a predetermined range or not;

wherein the controller allows illumination of the light source upon determination by the rotation detecting means of the rotational speed of the rotary filter unit being within the predetermined range, after execution of the pre-cooling/blowing step.

With the above construction, the rotary filter unit mounts a plurality of color filters disposed along the rotary peripheral direction of the unit and having different colors such as R (red), G (green), B (blue), etc. In operation, as this rotary filter is rotated at a high speed, the color filters thereof come in and out of a path of the irradiated light which is a white light, thereby changing the color components of the light one after another to be emitted from the light emitting elements onto the photosensitive material such as a print paper. In the course of this, each light emitting element of the exposing engine is turned ON/OFF momentarily according to given image information so as to transmit the light beam of each color component through the rotary filter onto the photosensitive material.

That is to say, according to the above-described construction, the illumination of the light source is allowed after the rotational speed of the rotary filter unit has reached the predetermined range. Therefore, it is possible to avoid not only damage of the optical fibers by overheating, but also damage of the rotary filter unit by overheating with the irradiated light from the light source when the rotary filter unit is not rotated at all or rotated at a lower speed.

According to a still further feature of the present invention, the controller is operable also to execute a post-blowing/cooling step of operating the cooling blower device for a predetermined period after the light source is turned OFF in response to an OFF instruction.

With this construction, when an operator inputs an OFF instruction, the light source is turned OFF immediately. On the other hand, the cooling blower device is not stopped immediately, but it continues to operate for a predetermined time period until the light receiving ends of the optical fibers have been cooled sufficiently (e.g. down to the room temperature). And, during this continued operation too, it is possible to prevent any dust present around the apparatus from being accumulated on the light receiving ends of the optical fibers. As a result, this construction can avoid such inconvenience of dust accumulated on the optical fiber from being carbonized and stuck on its light receiving end by the heat remaining in the fibers after the light source has been turned OFF.

According to a still further feature of the present invention, the apparatus further comprises:

cooling device monitoring means for monitoring the operational condition of the cooling blower device; and alarming means for reporting monitored result of the monitoring means to an operator when the operational condition of the cooling blower device is determined not normal.

With this construction, in response to alarm from the alarming means indicating any abnormality in the operational condition of the cooling blower device, the operator can manually operate an OFF switch of the light source. As the result, it is possible to minimize the damage of the light receiving ends of the optical fibers by the heat of the irradiated light.

According to a still further feature of the present invention, the cooling blower device comprises a fan and the operational condition of the cooling blower includes a rotational condition of the fan.

The cooling device monitoring means for monitoring the rotational condition of the fan can be realized by a DC motor having a sensor for detecting reduction in the rotational speed of the fan due to e.g. presence of some foreign substance by means of an eddy current generated in association therewith.

According to a still further feature of the present invention, the operational condition of the cooling blower device includes a positional relationship between the cooling blower device and the light receiving ends of the optical fibers.

The cooling device monitoring means operable to determine the positional relationship between the cooling blower device and the light receiving end of the optical fibers can be realized by a magnetic proximity switch attached to e.g. an air nozzle of the cooling blower device such that its electromagnetic circuit is closed only when the air nozzle has a proper positional relationship relative to the light receiving end of the optical fibers.

Further and other features and advantages of the present invention will become apparent from the following detailed discussion of the preferred embodiments with reference to the accompanying drawings.

DESCRIPTION OF THE PREFERRED EMBODIMENT

Figure 1:
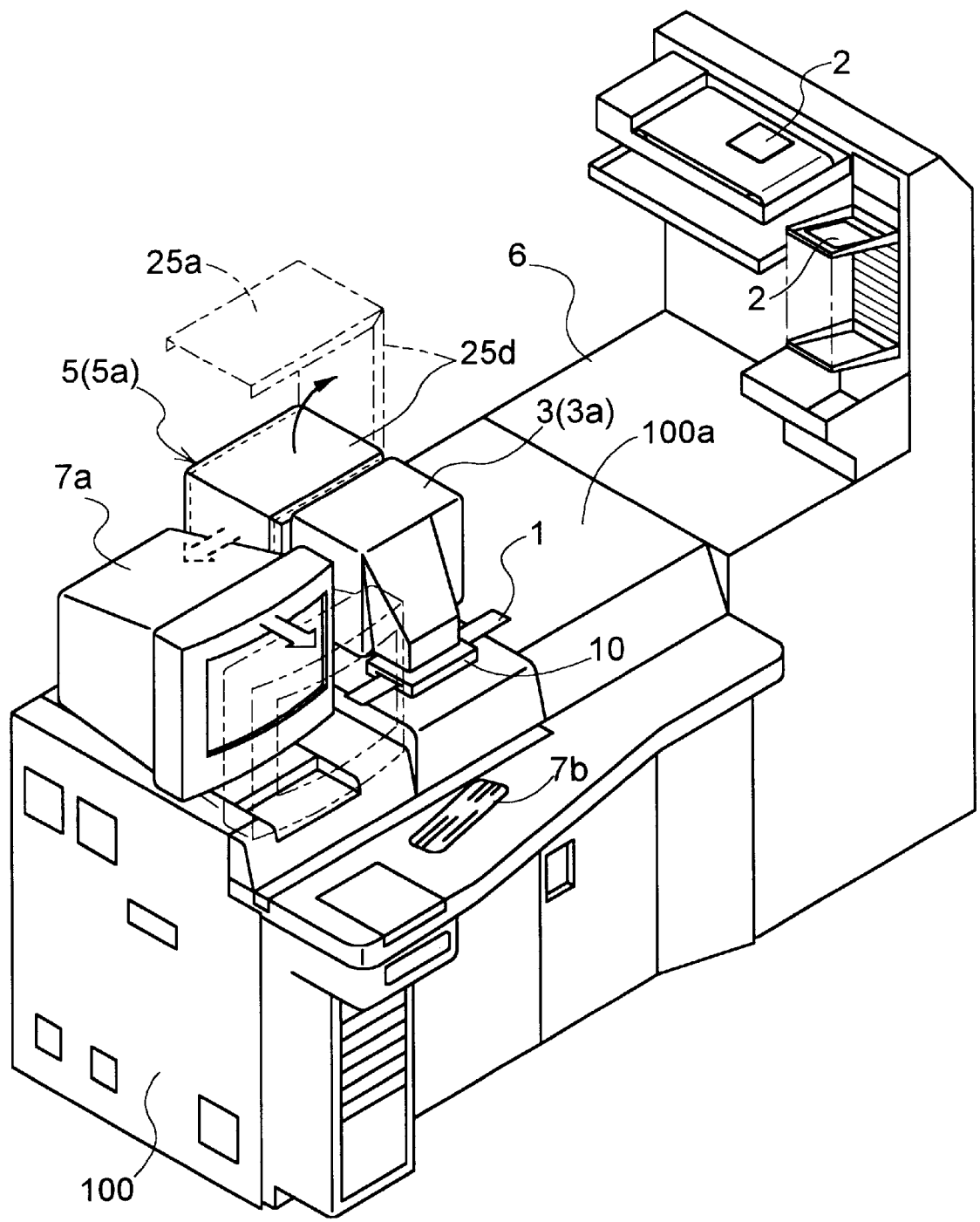
FIG. 1 is a perspective view showing an appearance of a printer processor as an embodiment of a light shutter type exposing apparatus relating to the present invention.
Figure 2:
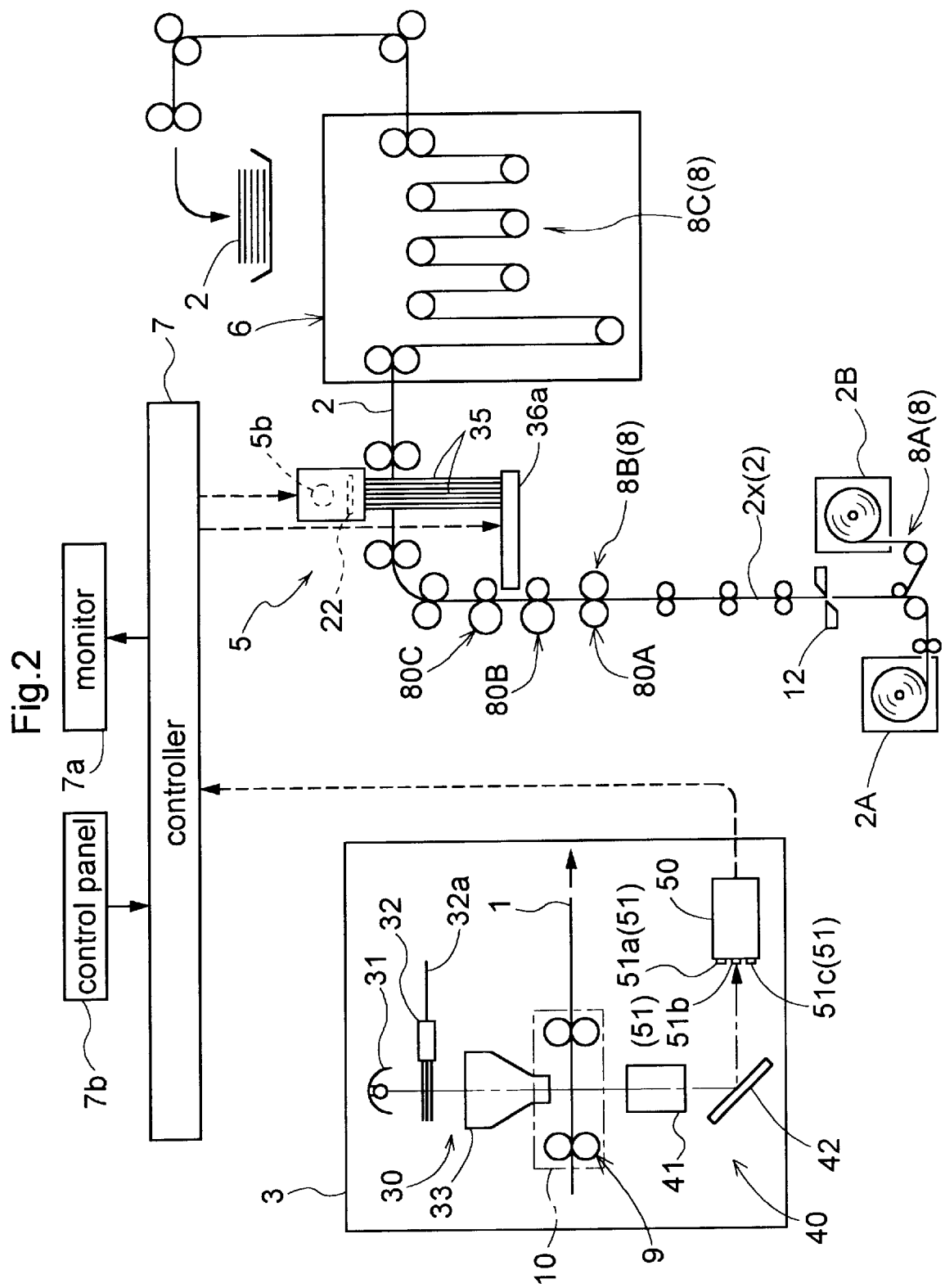
FIG. 2 is a block diagram showing functions of respective components of the printer processor shown in FIG. 1.

FIG. 1 is a perspective view schematically showing an appearance of a printer processor known also as a "digital lab". FIG. 2 is a schematic block diagram of the processor. This printer processor includes a digital printing unit 5 employing an image forming apparatus according to the present invention.

General Construction of the Printer Processor

The above-described digital processor implements a digital exposing method. As shown in FIG. 2, the processor includes a film scanner unit 3 for reading digital image data from an image frame of a developed photographic film (hereinafter, "film"), a storage means for temporarily storing the digital image data read by the film scanner unit 3, a controller 7 for generating print data based on the stored digital image data, a digital printing unit 5 for exposing on a print paper 2 an image corresponding to the image of the frame based on the print data, and a developing unit 6 for developing the exposed print paper 2. The print paper 2 developed by the developing unit 6 is subjected to a drying step and then discharged as a finished print.

The film scanner unit 3 includes, as its major components, an illumination optical unit 30, an image pickup optical unit 40, a photoelectric converter 50 using a CCD sensor 51, and an automatic film mask 10 for delimiting an irradiated area on the film and also transporting the film 1 along a sub-scanning direction for its scanning by the CCD sensor.

The illumination optical unit 30 includes a halogen lamp 31 as a white light source housed within a first lamp house 3a mounted on a top plate 100a of a housing 100. In operation, light beam from this halogen lamp 31 is adjusted in its light wavelength distribution and also in its light intensity distribution by means of a light-modulating filter 32, a mirror tunnel 33, etc. Then, this light is irradiated onto an image forming frame portion of the film 1 set on the automatic film mask 10. The image pickup optical unit 40 for processing the light transmitted through the film 2 includes a lens unit 41 and a mirror 42 for changing the traveling direction of the light beam. Incidentally, the light-modulating filter 32 includes a setup filter 32a for use during adjustment and this setup filter 32a may be set on an optical axis by an instruction from the controller 7.

The photoelectric converter 50 for converting the light guided by the image pickup optical unit 40 into electric signals includes, as the CCD sensor 51, three (3) CCD sensors 51a, 51b, 51c assigned for respectively detecting the R, G and B color components of the light. Each of these CCD sensors includes a number of (e.g. 5,000 units) of CCD elements aligned along a main scanning direction, that is, the width direction of the film 1 in this particular embodiment. The CCD sensor 51a for the red color includes, at its image pickup face, a color filter for selective transmission of the red component alone in the light past the film 1. The CCD sensor 51b for the green color includes, at its image pickup face, a color filter for selective transmission of the green component alone of the same light. And, the CCD sensor 51c for the blue color includes, at its image pickup face, a color filter for selective transmission of the blue component alone of the same. Accordingly, each of these sensors basically effects the photoelectric conversion of only one of the red, green and blue light components.

Once each frame image of the film 1 is fixedly set at a scanning position defined in the automatic film mask 10, the reading operation of this frame image is initiated, so that the transmission light through the frame image is subjected to successive line scanning operations respectively by the three CCD sensors 51a, 51b, 51c for the R, G, B components in association with a feeding operation of the film 1 by a film transporting mechanism 9. Since these R, G, B CCD sensors are spaced apart from each other by a distance corresponding to several pixels along the transporting direction of the film 1, in the course of the scanning operations above, there occur timing differences in the detection of the respective R, G, B light components. Then, the photoelectric converter 50 effects a subsequent signal processing operation for storing these timing differences within a memory in the controller 7 in correspondence with the R, G, B image signals for a same pixel. The above-described controlling operations of the respective components of the film scanner unit 3 such as the illumination optical unit 30, the image pickup optical unit 40 and the photoelectric converter 50 are executed by the controller 7. The controller 7 is connected with a monitor 7a for displaying data relating to the processing of the image information and a control panel 7b for allowing inputs of various processing instructions. And, this controller 7 includes, as its major component, a microcomputer system consisting of CPU, ROM, RAM, I/O interface etc. and the controller 7 provides the various functions required for the above-described controlling operations of the respective components by means of software as well as hardware.

As described hereinbefore, the digital printing unit 5 incorporates the image forming apparatus according to the present invention. More particularly, this unit comprises a PLZT shutter type line exposing head.

Figure 3A:
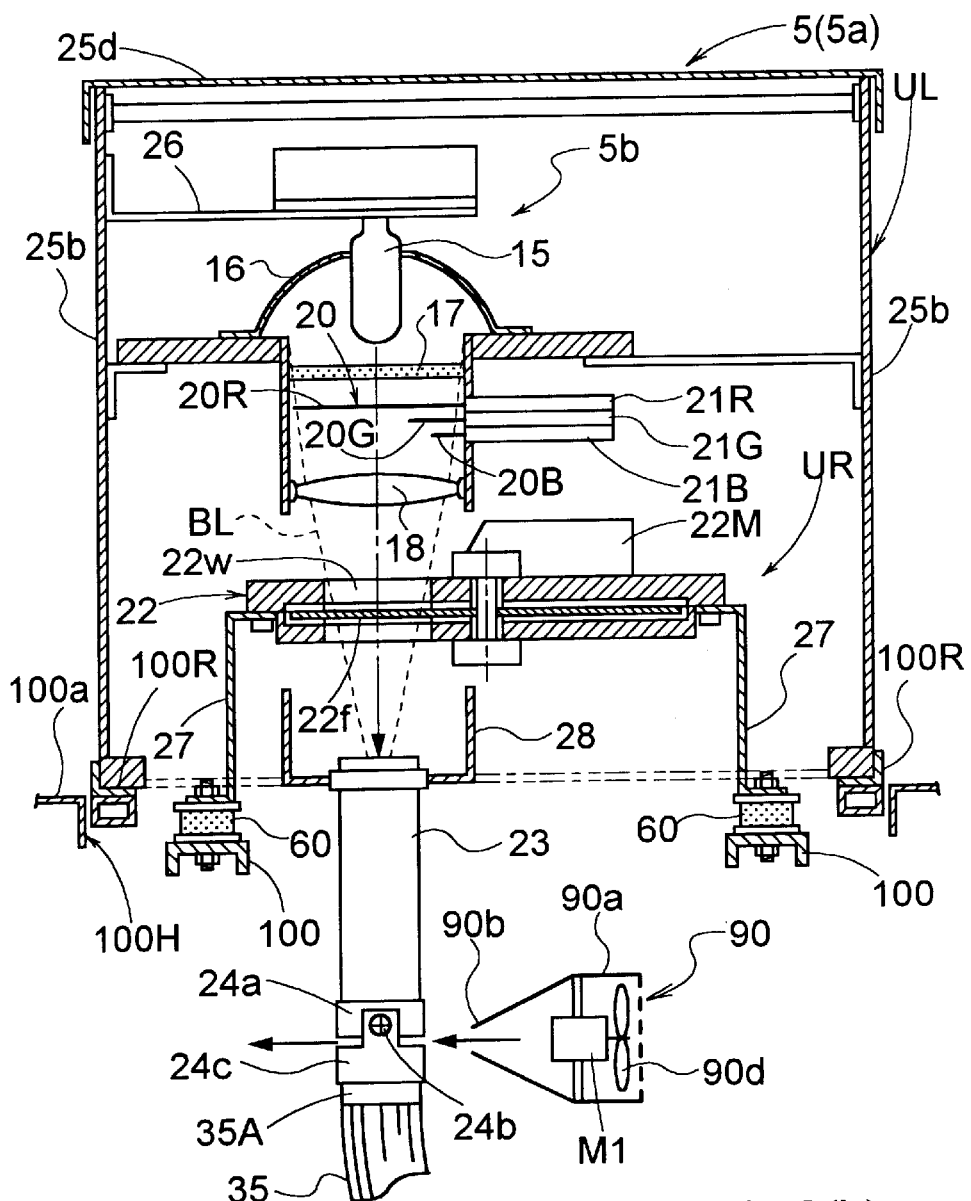
FIG. 3 is a partially cutaway schematic side view showing vicinity of a second lamp house of the printer processor shown in FIG. 1.
Figure 4:
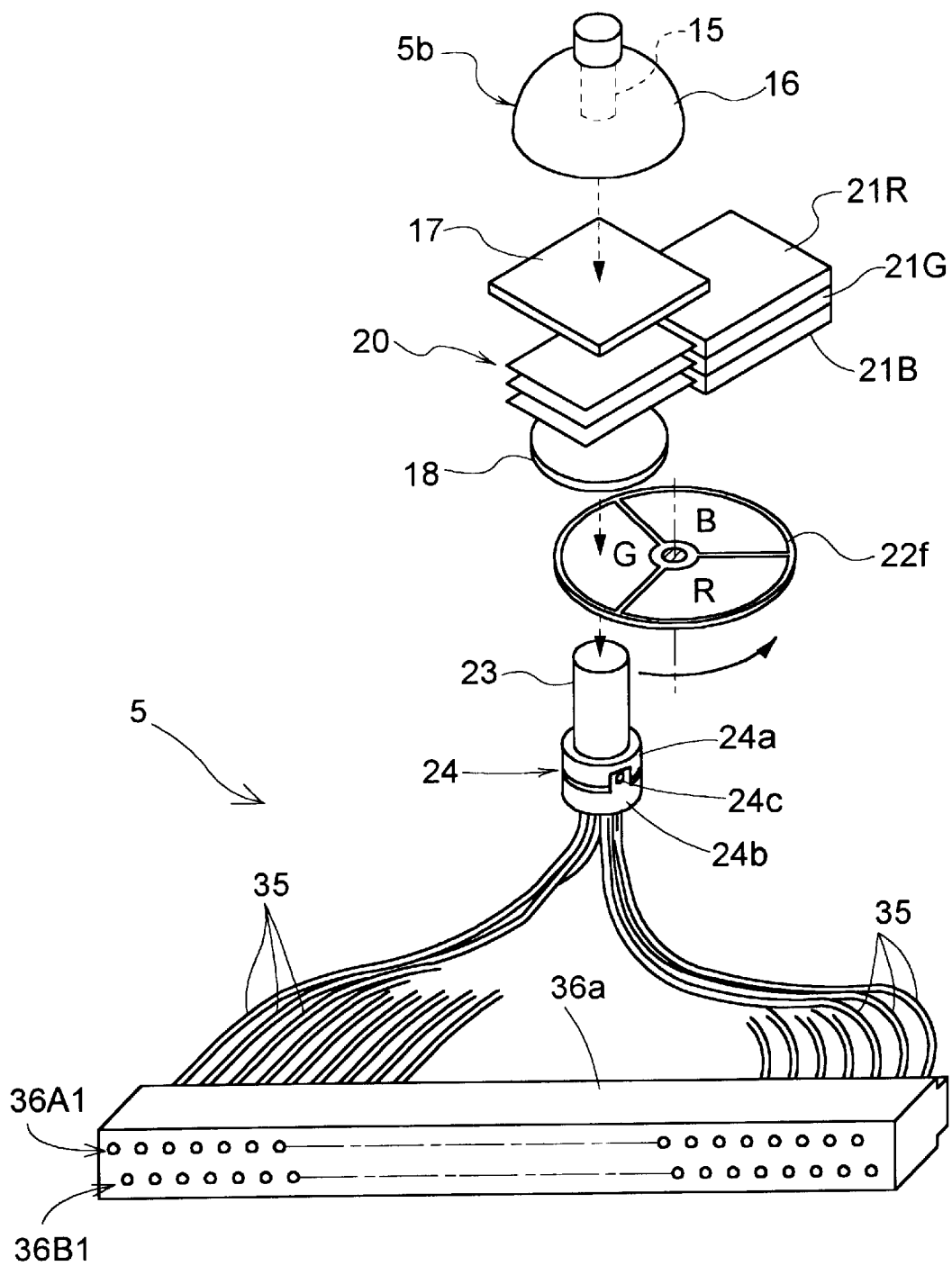
FIG. 4 is a perspective view conceptually illustrating principal components of a digital printing unit of the printer processor shown in FIG. 1.

As an exposing engine for exposing an instructed latent image on an unexposed print paper 2x, there is provided a shutter array 36a including an array of PLZT shutter elements (an example of a "light emitting element"). This shutter array 36a consisting essentially of the PLZT elements is made from transparent ferroelectric ceramic material obtained by adding lanthanum to lead zirconate titanate. Namely, this shutter array 36a utilizes the electro-optic effect inherent in this lead zirconate titanate. Hence, through this array, the white irradiated light from the light source 5b is wavelength-modulated into the respective light components of R, G, B and then guided through the number of optical fibers 35 to enter each shutter element alternately. For realizing this alternate introduction, as shown in FIG. 3(a) and FIG. 4, a rotary light modulating device 22 is provided between the light source 5b and the optical fibers 35. This rotary light modulating device 22 includes a rotary filter unit 22f having optical filters of the three colors R, G, B (an example of color filters having different cut wavelength ranges) arranged along the periphery thereof and an electric motor 22M for driving the rotary filter unit 22f at a high rotational speed of about 12,000 rpm.

Therefore, at each moment, only one of the R, G, B color filters is selectively aligned with the optical axis extending from the light source, so that the selected color light component through this particular filter is transmitted through the bundled optical fibers 35 to the respective shutter elements of the shutter array 36a. With application of a predetermined voltage thereto, each shutter element is rendered into a light transmitting state due to the above-described electro-optic effect inherent in lead zirconate titanate. And, upon cease of this voltage application, the element is rendered into a light blocking state. Therefore, with application of a driving voltage to the shutter corresponding to each pixel based on the print data from the controller 7, this particular shutter is opened to allow the component of light from the light source to be irradiated on the print paper 2.

By means of roller pairs 80B, 30c etc disposed upstream and downstream the shutter array 36a, the un-exposed print paper 2x is driven at a fixed rate along the sub-scanning direction in front of the shutter array 36a, whereby a two-dimensional latent image is formed on the print paper 2x.

Incidentally, as shown in FIG. 4, the respective light emitting points constituting this shutter array 36a consist of a first array 36A1 formed by odd-ordered light emitting points in the main scanning direction and a second array 36B1 formed by even-ordered light emitting points in the same direction, with the first array 36A1 and the second array 36B1 being spaced apart from each other by a distance corresponding substantially to five pixels in the sub-scanning direction (the exposing/transporting direction of the print paper) perpendicular to the main scanning direction. Further, the respective light emitting points in the first array 36A1 and the respective light emitting points in the second array 36B1 are spaced apart from each other by a pitch of about 120 μm in the main scanning direction.

The controller 7 includes a rotation controlling circuit for controlling the rotation of the rotary filter unit 22f. In operation, if the rotational speed of the rotary filter unit 22f is detected to be within the predetermined range, i.e., in the vicinity of the predetermined rotational speed of 12,000 rpm, a filter rotation detecting circuit 11 (an example of "rotational speed monitoring means". See FIG. 6) incorporated within this rotation controlling circuit outputs a rotation detection signal.

As shown in FIG. 3, the light source 5b of the digital printing unit 5 consists essentially of a halogen lamp 15 as a white light source housed inside a second lamp house 5a (disposed behind the first lamp house 3a of the film scanner unit) mounted on the top plate 100a of the housing 100 and a concave mirror 16 disposed behind the halogen lamp 15. Light beam BL formed by the light source 5b is first caused to pass an infrared cut filter 17 for cutting heat rays contained in the light beam as much as possible and this beam is then guided to a condenser lens 18 provided as a light converging means.

Further, between the halogen lamp 15 and the condenser lens 18, more particularly, between the infrared cut filter 17 and the condenser lens 18, there is disposed a light modulating filter unit 20. This light modulating filter unit 20 includes three light modulating filters 20R, 20G 20B having the R, G, B colors respectively. And, since all of these filters 20R, 20G, 20B are supported by associated actuators 21R, 21G, 21B which are independently controllable in response to an instruction signal from the controller 7, the overlapping amounts of the respective filters 20R, 20G, 20B into the light beam BL can be varied in a stepless manner, according to e.g. the specific properties of the print paper in use and/or the specific characteristics of the light irradiated from the halogen lamp 15.

The light beam BL passed through the condenser lens 18 enters a light inlet window 22w of the rotary light modulating device 22. As this light inlet window 22w is disposed at a position radially away from the rotational axis of the rotary filter unit 22f by a predetermined distance, the introduced light from the light source 5b passes the different color filters 20R, 20G, 20B one after another to be emitted from the downstream side (the lower side in the illustrated example) of the rotary light modulating device 22.

Downstream of the rotary modulating device 22, there is vertically disposed a light guiding glass rod 23 in the form of a square (or circular as illustrated) pole coaxial with the light inlet window 22w. The downstream end face of this light guiding glass rod 23 and an upstream end face of the bundled optical fibers 35 are joined with each other via a coupling member 24 with maintaining a predetermined distance between the two end faces and also maintaining these faces parallel with each other. This coupling member 24 includes a first coupling element 24a fitted over the downstream end face of the light guiding glass rod 23 and a second coupling element 24b for fitting over the upstream end faces of the optical fibers 35 and fastening them together. And, these first and second coupling elements 24a, 24b are connected with each other by means of a pair of screw means 24c. As described above, between the first coupling element 24a and the second coupling element 24b, there is formed a small gap.

The optical fibers 35 are made of resin material having a manufacturer's guaranteed heat resistant value of 70° C. or less approximately. Then, in order to avoid overheating of the optical fibers 35, particularly their light receiving ends 35A by the light beam BL (an example of "irradiated light") from the halogen lamp 15, there is provided a cooling blower device 90. As shown in FIG. 3(a) which is a side view showing the vicinity of the second lamp house 5a and also in FIG. 3(b) which is a plan view showing principal portions including the cooling blower device 90, this cooling blower device 90 includes a main body 90a having a nozzle 90b with a horizontally extending longitudinal aperture, a rotary fan 90d for drawing in ambient air from an inlet opening 90c on the opposite side away from the nozzle 90b and feeding this air to the nozzle 90b, and a DC motor M1 for rotatably driving the rotary fan 90d. The nozzle 90b is opened toward the above-described gap formed between the coupling elements 24a, 24b. The DC motor M1 comprises a brushless motor having a sensor (an example of "cooling device monitoring means"). This brushless motor with a sensor has a function of detecting reduction in the rotational speed of the fan due to e.g. presence of some foreign substance by means of an eddy current generated in the coil of the motor in association with such reduction.

Figure 3B:
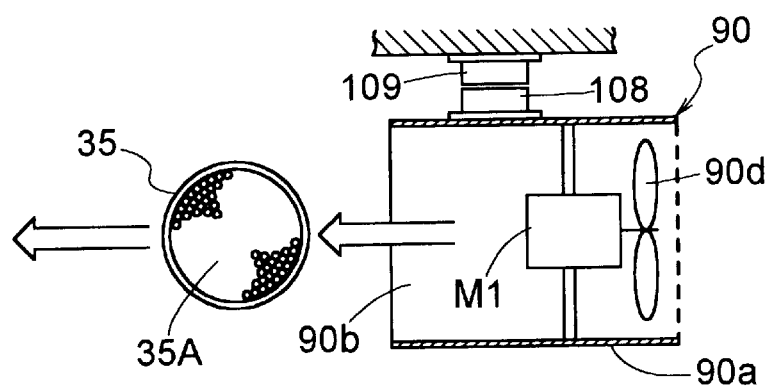

Further, as shown in FIG. 3(b), the cooling blower device 90 further includes a position detecting unit (another example of the "cooling device monitoring means") for detecting the relative position between the coupling elements 24a, 24b of the main body 90a and the orientation of the nozzle 90b. Specifically, this position detecting unit consists essentially of a magnet 108 attached to a lateral face of the main body 90a and a magnetic proximity switch 109 fixed to the housing of the printer processor. When the relative positional relationship between the main body 90a and the coupling elements 24a, 24b is correct and the nozzle 90b is oriented properly toward the gap between the coupling elements 24a, 24b, then, the magnetic proximity switch 109 detects a magnetic field generated by the magnet 108 and the proximity switch 109 outputs a signal indicative of an ON state.

Figure 6:
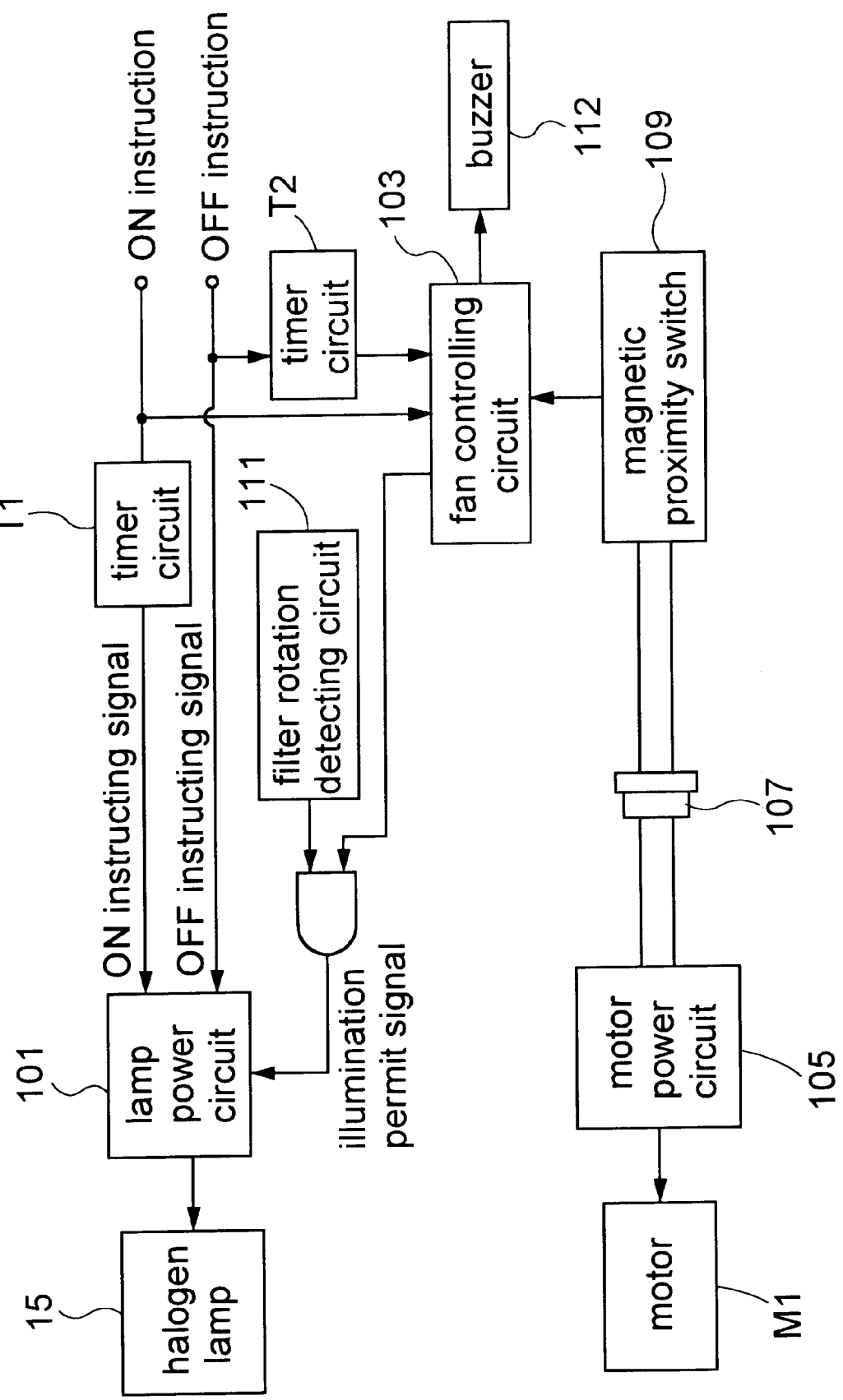
FIG. 6 is a schematic view showing an embodiment of a light-source controlling circuit.

The controller 7 further includes a light source controlling circuit 120 as illustrated in FIG. 6. This light source controlling circuit 120 includes, as major components thereof, a lamp power circuit 101 for providing current to the halogen lamp 15 for illuminating the same, a fan controlling circuit 103 for controlling the operation of the cooling blower device 90, a motor power circuit 105 for providing current to the DC motor M1 for driving the rotary fan 90d, a filter rotation detecting circuit 111 for monitoring the rotational speed of the rotary filter unit 22f (an example of rotation detecting means and forming a part of the rotation controlling circuit for the rotary filter unit 22f), two timer circuits T1, T2 and a buzzer 112. The fan controlling circuit 103 and the motor power circuit 105 are connected to each other via a connector 107.

When an operator inputs an illumination or lamp ON instruction, the timer circuit T1 and the fan controlling circuit 103 are energized simultaneously. Upon this energization, the fan controlling circuit 103 energizes the motor power circuit 105 immediately to rotatably drive the DC motor M1, whereby a pre-blowing/cooling step by the rotary fan 90d on the light receiving end 35A of the optical fibers is initiated. And, if three conditions are met, that is, the normal connection of the connector 107, the normal rotation of the DC motor M1 and the ON state of the magnetic proximity switch 109, and also if the filter rotation detecting circuit 22f is receiving a detection signal indicating "the rotary filter unit 22f being rotated at a speed within the predetermined range"; then, from an AND gate connecting the fan controlling circuit 103 and the filter rotation detecting circuit 111, an "illumination permit signal" is outputted to the lamp power circuit 101. On the other hand, upon lapse of the predetermined time period (e.g. 15 seconds) from the energization, the timer circuit T1 outputs an "ON instructing signal" to the lamp power circuit 101. And, with satisfaction of the illumination conditions of the "illumination permit signal" from the AND gate and the "ON instructing signal" from the timer circuit T1 are inputted to the lamp power circuit 101, the lamp power circuit 101 starts power supply to the halogen lamp 15.

Therefore, when the operator gives an ON instruction of the halogen lamp 15, the halogen lamp 15 is not illuminated immediately. Rather, the cooling blower device 90 is operated first. And, only when the two conditions are met simultaneously, i.e. the condition: "the cooling blower device 90 has been operated properly for the predetermined time period in the pre-blowing/cooling step", and the other condition: "the rotary filter unit 22f is being rotated at a speed within the predetermined range", the illumination of the halogen lamp 15 is effected. If any dust has been accumulated on the light receiving ends 35A of the optical fibers 35, such dust will be blown away by the cooling air current supplied from the cooling blower device 90 to the light receiving end 35A of the optical fibers. Hence, this avoids the problem of subsequent carbonization of such dust by the irradiated light and sticking thereof on the light receiving end 35A of the optical fibers 35. As a result, this construction can solve the problem of resultant deterioration in the light transmittivity of the optical fibers 35 leading to quality deterioration in the image to be formed by the image forming apparatus and also the problem of melting deformation of the light receiving ends 35A of the optical fibers 35 leading to necessity of replacement of the entire digital exposure head of the apparatus. The construction solves another problem of damage in the rotary filter unit 22f by the irradiated light when the filter unit has not reached the predetermined rotational speed. Incidentally, the dust blown away by the cooling air current during the pre-blowing/cooling step is moved and fixedly entrapped to a surface or into tissue of a dust collecting filter which is disposed within a ventilation hole formed between the housing of the image forming apparatus and the outside.

On the other hand, when the illumination instruction is inputted, if the fan controlling circuit 103 detects any abnormality in any one of the three conditions concerning the cooling blower device 90, i.e. any deviation from the normal connection of the connector 107, the normal rotation of the DC motor M1 and the ON state of the magnetic proximity switch 109, then, the "illumination permit signal" is not outputted and the buzzer 112 is activated instead to notify the operator of the abnormality. Then, the operator needs to look into the three conditions and to amend the abnormal condition of the cooling blower device 90, then give the illumination instruction again.

Next, if the operator inputs an OFF instruction during illumination of the halogen lamp 15, an "OFF instructing signal" is inputted to the lamp power circuit 101, whereby the halogen lamp is turned OFF immediately. Simultaneously with this; however, the timer circuit T2 is energized. Upon lapse of a predetermined time period (e.g. 15 seconds) from this energization of the timer circuit T2, the timer circuit T2 outputs a "STOP signal" to the fan controlling circuit 103, whereby the operation of the cooling blower device 90 is stopped.

That is, the controller 7 stops the operation of the cooling blower device 90 after a "post-blowing/cooling step" of operating the cooling blower device for 15 seconds (an example of "the predetermined period") after the halogen lamp 15 is turned OFF. Accordingly, when the operator issues a lamp OFF instruction, the light source is turned OFF immediately, but the operation of the cooling blower device 90 is not stopped immediately. The cooling blower device 90 is continuously operated until the light receiving end 35A of the optical fibers 35 has been cooled sufficiently by the cooling blower device 90. And, during this continued operation too, accumulation of dust on the light receiving end 35A of the optical fibers 35 is prevented. Therefore, the problem of carbonization of accumulated dust by the heat remaining and stored within the optical fibers immediately after the OFF operation of t he halogen lamp 15 and resultant sticking of such dust on the light receiving end 35A of the optical fibers 35 can be avoided.

Construction of the Second Lamp House

Figure 5:
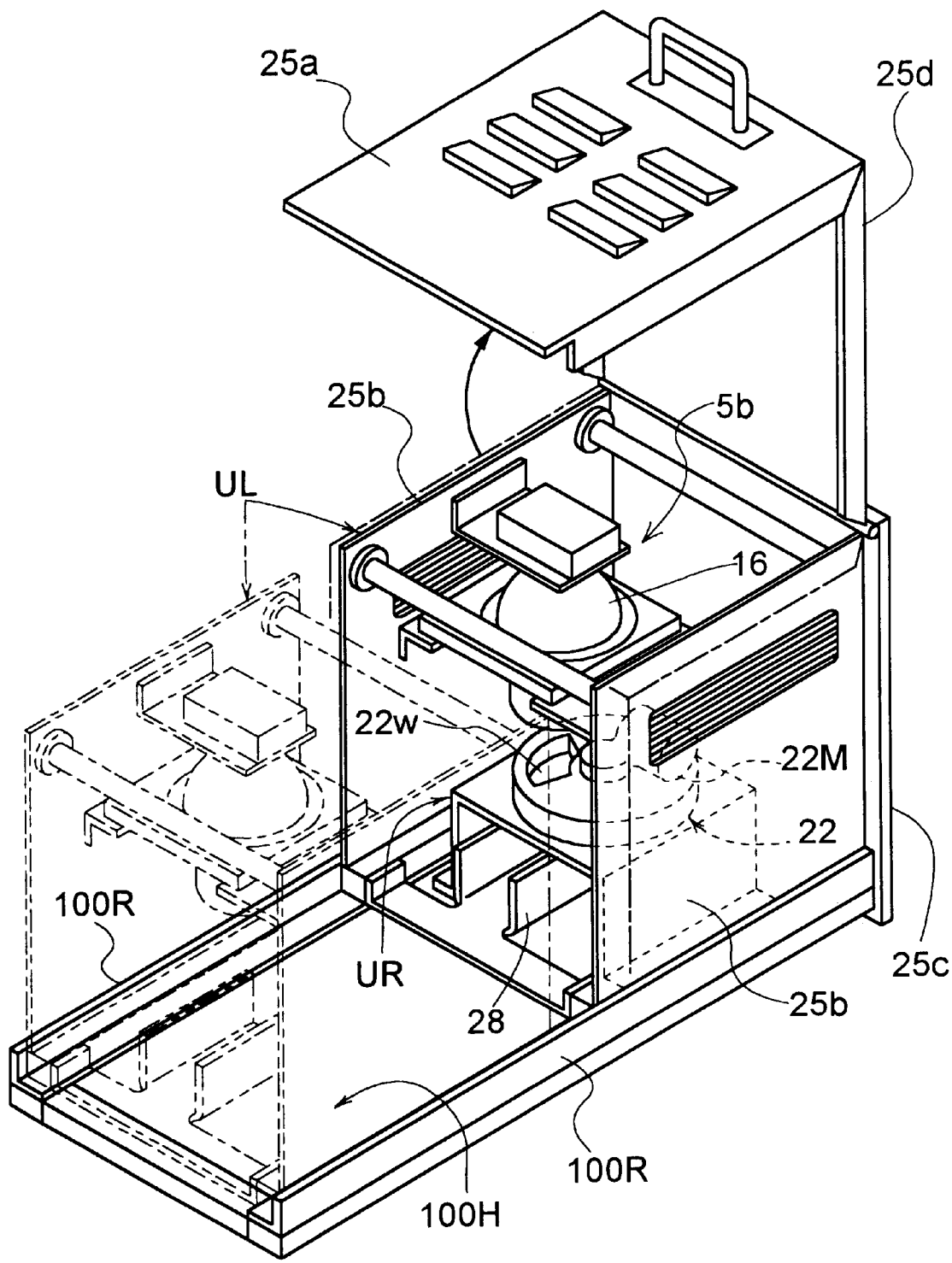
FIG. 5 is a schematic perspective view showing an example of the construction of the second lamp house of the printer processor shown in FIG. 1.

As shown in FIG. 5, the top plate 100a of the housing 100 defines a through hole 100H. The second lamp house 5a consists mainly of a first side wall 25a and a third side wall 25c as a pair of walls extending vertically upward from opposed sides of the through hole 100H in a use condition, a ceiling member 25d extending horizontally between the first side wall 25a and an upper end of the third side wall 25c, and a pair of second side walls 25b, 25b extending vertically upward from the other opposed sides of the through hole 100H. The third side wall 25c is fixed to the housing 100, whereas the ceiling member 25d is pivotably supported to the upper end of the third side wall 25c. Therefore, this second lamp house can selectively assume a closed condition in which the ceiling member 25d closes the top of the second lamp house 5a to form its top face and an opened condition in which the top of the second lamp house 5a is opened. Further, the first side wall 25a is fixed to a free end of the ceiling member 25d to extend perpendicularly and integrally therefrom. Thus, with the above-described switchover of the posture of the ceiling member 25d, there is necessarily provided a closed condition in which the first side wall closes the left side of the second lamp house 5a and an opened condition (denoted with solid lines in FIG. 5) in which the left side of the second lamp house 5a is opened as seen by the operator located on the front side of the printer processor.

The pair of second side walls 25b, 25b are slidably mounted on a pair of rail members 100R, 100R which are disposed to extend horizontally to the left-hand side from the base end of the third side wall 25c. Namely, the second side walls 25b, 25b are slidably switchable between one posture in which these second side walls 25b, 25b are placed in contact with the third side wall 25c to form the front and rear walls of the second lamp house 5a and a further posture in which the second side walls are left-wise apart from the third side wall 25c as seen from the operator. Needless to say, the switchover operation to this depart posture is made possible only after the ceiling member 25d and the first side wall 25 have been switched over to the opened condition described above.

Referring back to FIG. 3, adjacent the upper end of one of the pair of second side walls 25b, 25b, an upper bracket 26 is extended substantially horizontally toward the inner side of the second lamp house 5a, and on the lower face of this upper bracket 26, the halogen lamp 15 is mounted. Further, the second side walls 25b, 25b also mount the concave mirror 16 for forming a substantially parallel downwardly oriented light ray from the irradiated light from the halogen lamp 15, the infrared cut filter 17, the light modulating filters 20R, 20G, 20B supported respectively by the actuators 21R, 21G, 21B, and the condenser lens 18 as a light converging means from upper to lower positions in the mentioned order. Further, between the lower ends of the pair of second side walls 25b, 25b, there is supported a lower bracket 28, to which the light guiding glass rod 23 is vertically fixed. That is, the pair of second side walls 25b, 25b, the halogen lamp 15, the concave mirror 16 and the light guiding glass rod 23 together constitute a light path maintaining unit UL slidable on the pair of rail members 100R, 100R. Needless to say, within this light path maintaining unit UL, irrespectively of the sliding movement of this light path maintaining unit UL on the rail members 100R, 100R, the axis of the light guiding glass rod 23 is adapted to be in constant alignment with the axis of the light beam formed by the halogen lamp 15 and the concave mirror 16. Incidentally, as shown in FIG. 5, the pair of second side walls 25b, 25b extend parallel with the sliding direction of light path maintaining unit UL on the rail members 100R, 100R.

As shown also in FIG. 3, from the housing 100 adjacent the pair of rail members 100R, 100R, there is vertically disposed an intermediate bracket 27 and on a horizontal plate-like member constituting the upper end of this intermediate bracket 27, there is fixed the rotary light modulating device 22. The intermediate bracket 27 and the rotary light modulating device 22 together constitute a rotary filter unit UR which is immovably fixed to the housing 100. Further, as shown in FIG. 3, the intermediate bracket 27 is not directly fixed to the housing, but fixed to the housing 100 via an anti-vibration member 60 made of rubber. Therefore, vibration occurring in the rotary filter unit UR inside the rotary light modulating device 22 may be damped by the anti-vibration member 60 and will hardly be transmitted to the housing 100. Moreover, the light path maintaining unit UL is adapted to be slidable on the rail members 100R, 100R fixed to the housing 100; that is, this unit is provided as a unit entirely independent of the rotary filter unit UR. Therefore, any vibration if transmitted to the housing 100 will hardly vibrate the light guiding glass rod 23 inside the light path maintaining unit UL.

When the pair of second side walls 25b, 25b are moved to the right end as seen from the operator to be brought into abutment against the third side wall 25c, thereby to fix the light path maintaining unit UL in position relative to the rotary filter unit UR, the axis of the light beam BL formed by the halogen lamp 15 and the concave mirror 16 (necessarily, the axis of the light guiding glass rod 23 as well) will be located substantially at the center of the light inlet window 22w of the rotary light modulating device 22. Then, under this condition, by switching the first side wall 25a and the ceiling member 25d to the respective closed conditions, the second lamp house 5a will enclose the light source lamp 5b at least from the front and rear sides and the upper side thereof.

The monitor 7a is mounted on the housing 100 to movable in the forward and rearward directions as seen from the operator. That is, during a normal operation, the monitor 7a will be located at a position slightly retracted away from the operator, that is, on the immediate left side of the second lamp house 5a. Therefore, under this condition, if the operator attempts to pull the light path maintaining unit UL of the second lamp house 5a toward its second posture, then, this movement will be interfered with by the monitor 7a. However, the monitor 7a can be manually moved to its retracted position closer to the operator (denoted with two-dot chain lines in FIG. 1). At this retracted position, the left side of the second lamp house 5a as seen from the operator is opened to expose the rail members 100R, 100R. Then, it becomes possible to switch over the first side wall 25a and the ceiling member 25d of the second lamp house 5a to the opened conditions and subsequently to slide the light path maintaining unit UL on the rail members 100R, 100R to render it into the second posture.

Referring back to FIG. 2, at the upstream end of the digital printing unit 5, there are provided two print paper magazines 2A, 2B and each print paper magazine 2A, 2B stores therein the print paper 2 in a rolled state with its emulsion-applied face thereof oriented to the outside. On the downstream side of these print paper magazines 2A, 2B, there is provided a print paper transporting mechanism 8 for transporting the print paper 2 as it is being processed.

The print paper transporting mechanism 8 includes a print paper supply line 8A disposed downstream adjacent the print paper magazines 2A, 2B, an exposure transport line 8B downstream adjacent the supply line, and a development transport line 8C further downstream thereof.

The print paper supply line 8A includes series of roller pairs which take out the print paper 2 selectively from either print paper magazine 2A or 2B and transports it to a paper cutter 12 and then transports print paper 2 in the form of short strips by being cut by the cutter 12 one after another to the subsequent exposure transport line 2B.

In the exposure transport line 8B, exposure operations are effected by the shutter array 36a acting as the exposing engine on the print paper 2 being transported continuously. The exposed print paper 2 discharged from the exposure transport line 8B is then transported to the development transport line 8C.

The exposure transport line 8B includes an intermediate transport roller unit 80A constituting an inlet area of the exposure transport line 8B, a first exposure transport roller unit 80B disposed adjacent the inlet across the exposure point of the exposure head 36a of the digital printing unit 5 and a second exposure transport roller unit 80C disposed adjacent the outlet. Each of these roller units, i.e. the intermediate transport roller unit 80A, and the first and second exposure transport roller units 80B, 80C, comprises a roller pair consisting of a drive roller and a press roller which can be moved into contact with or away from the drive roller.

Next, other embodiments of the present invention will be described respectively.

(1) The ON/OFF operations of the cooling blower device 90 for protecting especially the light receiving end 35A of the optical fibers 35 from overheating may be effected automatically in response to the ON/OFF of the printer processor per se or its digital printing unit 5.

That is, this construction can be realized as follows for example. In response to the ON operation of the printer processor per se or its digital printing unit 5, first the cooling blower device 90 will be activated. Next, based on the result of determination of the operational condition of the cooling blower device 90 by the cooling device monitoring means, the illumination of the light source 5b will be automatically effected subsequently.

A still further construction as follows is also possible. Namely, with ON operation of the printer processor per se or its digital printing unit 5, first, the cooling blower device 90 for the light receiving ends 35A of the optical fibers and another cooling blower device (not shown) provided for the light source 5b will be activated automatically at one time or one after another. Then, based on the determination of the cooling device monitoring means on the operational conditions of the cooling blower device 90 and the other cooling blower device for the light source 5b, the illumination of the light source 5b will be automatically effected thereafter.

As for the OFF operation of the printer processor, it is possible to provide an OFF program mode which can be selectively executed by the operator using the monitor 7a and the control panel 7b. That is, with execution of this OFF program mode when the operation of the printer processor is to be stopped for example, the OFF operation of the light source 5b is effected first. Then, upon lapse of a predetermined time period (this period may be set as e.g. 20 minutes, in consideration of the time period required for the light source 5b to be cooled sufficiently by the further cooling blower device which continues to operate during illumination of the light source 5b), the power switch of the printer processor or of its digital printing unit 5 will be turned OFF and simultaneously therewith the cooling blower device 90 for the optical fibers 35 and the other cooling blower device operatively associated therewith and provided for the light source 5b will be turned OFF.

In the case of the above construction, if the power switch of the printer processor or of its digital printing unit 5 is turned OFF without selection of the OFF program mode, first the light source 5b is turned OFF. Then, the cooling blower device 90 for the optical fibers 35 and the further cooling blower device for the light source will be driven by means of a battery power source (not shown) separately provided for a predetermined time period, upon lapse of which these cooling devices will be stopped.

(2) The exposing head employed in the digital printing unit 5 is not limited to the PLZT engine employed in the foregoing embodiment. A DMD engine may be employed instead. The light emitting elements used in such DMD engine comprise a number of small mirror elements (micro mirrors) which are supported to be pivotable between an ON posture for emitting the light beam transmitted from the light source lamp via the rotary filter unit and the light guiding means onto the print paper and an OFF posture for emitting the light beam in a direction off the print paper.

The present invention may be embodied in any other manner than described above. The disclosed embodiments are not limiting, but only illustrating the present invention. Further and other modifications will be readily made by one skilled in the art without departing from the essential spirit of the invention defined in the appended claims.

What is claimed is:

1. An image forming apparatus comprising:
  a number of light emitting elements capable of emitting a light beam onto a photosensitive material based on given image information;
  a number of optical fibers extending between a light source and the light emitting elements for guiding irradiated light from the light source to the light emitting elements, each of the optical fibers having a light receiving end for receiving the irradiated light;
  inputting means for inputting a turn-ON instruction for the light source;
  a blower device for removing dust accumulated on the light receiving end by means of a gas stream having a directional component interesting the axis of the optical fiber; and
  a controller for executing a dust removing step for operating the blower device for a predetermined time period in response of said turn-ON instruction for the light source from said inputting means and then turning ON the light source while keeping the blower device in operation for cooling the optical fibers and for also executing a post-blowing/cooling step of operating the blower device for predetermined period after the light source is turned OFF in response to an OFF instruction for the light source.

2. The image forming apparatus according to claim 1, further comprising:
  light modulating means for modulating wavelength of the irradiated light, the light modulating means being a rotary filter unit interposed between the light source and the optical fibers, the rotary filter unit including a plurality of color filters arranged side by side along a peripheral direction of the filter unit and having cut wavelength ranges different from each other; and
  rotation detecting means for determining whether a rotational speed of the rotary filter units is within a predetermined range or not;
  wherein the controller allows illumination of the light source upon determination by the rotation detecting means of the rotational speed of the rotary filter unit being within the predetermined range, after execution of the dust removing step.

3. The image forming apparatus according to claim 1, further comprising:
  blower device monitoring means for monitoring the operational condition of the blower device including monitoring of whether the blower device is normally operated or not; and
  alarming means for reporting monitored result of the monitoring means to an operator when the operational condition of the blower device is determined not normal by said blower device monitoring means.

4. The image forming apparatus according to claim 3, wherein the blower device comprises a fan and the operational condition of the blower device includes a rotational condition of the fan.

5. The image forming apparatus according to claim 3, wherein the operational condition of the blower device includes a positional relationship between the blower device and the light receiving ends of the optical fibers.

6. An image forming apparatus comprising:
  a number of light emitting elements capable of emitting a light beam onto a photosensitive material based on given image information;
  light guiding means for guiding the irradiated light from the light source to the light emitting elements, the light guiding means including a light guiding rod for receiving the irradiated light and a number of optical fibers extending between the light guiding rod and the number of light emitting elements, a small gap being formed between a downstream end face of the light guiding rod and light receiving end of the optical fibers, with the gap extending along the surface of the light receiving ends of the optical fibers;
  inputting means for a turn-ON instruction for the light source;
  a blower device disposed laterally of said gap, the blower device including a blower an and a lower nozzle, said blower nozzle being oriented toward said gap so as to blow away and remove dust present on the light receiving ends of the optical fibers by a gas stream fed from said blower nozzle; and a controller for executing a dust removing step operating the blower device for a predetermined time period in response to said turn-ON instruction for the light source from said inputting means and then turning ON the light source while keeping the blower device in operation for cooling the optical fibers and for also executing a post-blowing/cooling step of operating the blower device for a predetermined period after the light source is turned OFF in response to an OFF instruction for the light source.

* * * * *